United States Patent [19]

Bonetti

[11] Patent Number: 5,324,008
[45] Date of Patent: Jun. 28, 1994

[54] BALL VALVE WITH OFFSET THROUGH-DUCT

[75] Inventor: Giulio Bonetti, Milan, Italy

[73] Assignee: Cesare Bonetti S.P.A., Garbagnate Milanese, Italy

[21] Appl. No.: 58,010

[22] Filed: May 5, 1993

[30] Foreign Application Priority Data

May 15, 1992 [IT] Italy ................ MI92 A 001178

[51] Int. Cl.$^5$ ............................................. F16K 5/06
[52] U.S. Cl. ............................ 251/315 BC; 251/315 R
[58] Field of Search ............... 251/304, 315, 315 R, 251/315 BC

[56] References Cited

U.S. PATENT DOCUMENTS 3,542,337 11/1970 Scaramucci .
5,070,909 12/1991 Davenport ...................... 251/315

FOREIGN PATENT DOCUMENTS 0325846 8/1989 European Pat. Off. ............ 251/304
0428331 5/1991 European Pat. Off. .
410027 2/1925 Fed. Rep. of Germany .

Primary Examiner—John C. Fox
Attorney, Agent, or Firm—Herbert Dubno

[57] ABSTRACT

A fluid ducting valve of the type comprising an interception ball fitted with a through-duct and sealing rings interposed between such ball and fluid flow ducts, in which such through-duct of ball is located with its longitudinal axis offset in the downstream direction relative to the axis of rotation of ball, when the latter is rotated to the position of interception, the relatives distance between the longitudinal axis of duct and the axis of rotation of ball being such that upstream apertures of duct are always closed before downstream apertures move on downstream sealing rings with the valve either closed or open.

2 Claims, 1 Drawing Sheet

BALL VALVE WITH OFFSET THROUGH-DUCT

FIELD OF THE INVENTION

My present invention relates to a valve having a ball for the interception and/or diversion, discharge and regulation of fluids, in which the ball is fitted with a fluid flow duct the longitudinal axis of which is shifted in the downstream direction when the ball is rotated to the position of interception of the fluid.

BACKGROUND OF THE INVENTION

As is known, so-called "ball" valves are substantially comprised of a valve body, with a cylindrical cavity to which two or more ducts are connected for the fluid to be distributed or intercepted, and a ball provided with a longitudinal axial duct and capable of being operated from the outside, located within the cylindrical cavity and capable of being rotated so as to set the axial duct in alignment with the direction of the fluid for the passage thereof, or conversely with the duct set transverse relative to the direction of the fluid for the interception thereof.

The principal problems associated with the use of such valves are substantially centered on the sealing rings which surround the ball and are required to maintain a seal between the inlet and the ports in the two directions and between both ports and the axis of control toward the exterior.

Such sealing rings are subjected to pressure between the fixed part and the moving part, for which reason any wear likely to give rise to clearances which cannot be remedied should be avoided.

In particular, the sealing rings located upstream and downstream of the ball and in the direction of flow of the fluid are subjected to the erosive action of the fluid, particularly during closure and opening of the ball; during such operations, the axial duct of the ball which is rotated limits the inflow of fluid via the ball, but does not obstruct it completely; therefore, since the outflow channel is still open, there is encountered a marked increase in the velocity of the fluid with generation of turbulence acting on the upstream and downstream sealing rings, ultimately causing erosion thereof with resulting loss of sealing.

This condition is further aggravated by the fact that the fluids to be intercepted are normally supplied at high pressure and at high temperatures, as in the case of saturated steam, and the wear is more apparent in regard to the downstream gasket which is more likely to be exposed to such erosion and which is responsible for maintaining a seal when the valve is open.

OBJECT OF THE INVENTION

It is the object of the invention to provide an improved ball valve in which the sealing rings, particularly the rings located downstream of the ball and in the direction of flow of the fluid, are not subjected to the action of the fluid when the ball is rotated in order to open and/or close the valve, thus preventing wear thereof with resulting loss of sealing.

SUMMARY OF THE INVENTION

This object is achieved according to this invention by a valve for the ducting of fluids, of the type comprising an interception ball provided with a through-duct and sealing rings located between the ball and the fluid flow ducts, in which the through-duct or passage of the ball is located with its longitudinal axis offset in the downstream direction relative to the axis of rotation of the ball, when the latter is rotated to the position of interception, the relative distance between the longitudinal axis of the duct and the axis of rotation of the ball being such that the upstream apertures of the duct are always closed before the downstream apertures move on the downstream sealing rings with the valve either closed or open.

According to a preferred embodiment, the valve has the longitudinal axis of the duct and the axis of rotation of the ball located perpendicular to one another.

In a further advantageous embodiment, the flow duct is subdivided into longitudinal channels, independent of one another and with parallel axes, for the deflection of the flow through the valve by the closure of at least one of such channels via the upstream sealing ring.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
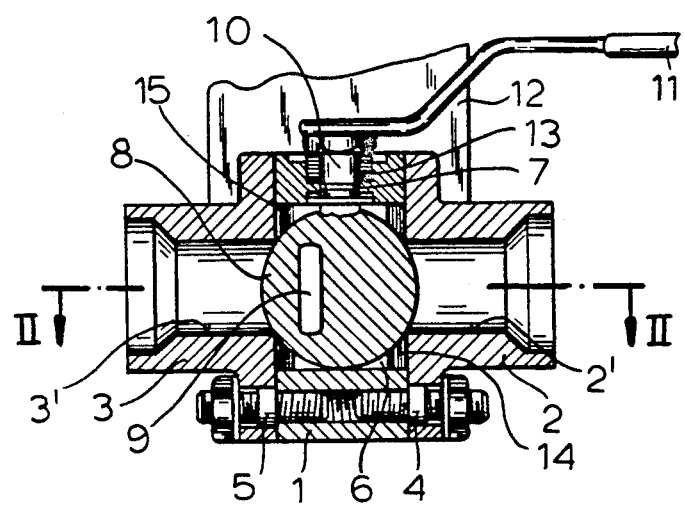
FIG. 1 is an axial section of a valve according to this invention.

As shown in FIG. 1, the valve according to this invention is comprised of a central body 1 and two flanged attachments 2 and 3 located coaxially with body 1 and connected thereto by means of screws or studs 4 and 5.

Central body 1 has an internal cylindrical cavity 6 located in the axial sense, and a cylindrical hole 7 perpendicular to the axis. Each flanged attachment 2 and 3 has within it an axial duct 2' and 3' so that, when these attachments are fitted to central body 1, internal ducts 2' and 3' are coaxial with the cylindrical chamber 6 of central body 1.

Inside the cylindrical chamber 6 and within the axis of ducts 2' and 3' is located a ball 8 within which is provided a through-duct or passage 9. Such ball 8 may be rotated via a shaft 10 capable of being operated from the outside via a hand lever 11 or by automatic means generically represented at 12.

Shaft 10 operating ball 8 and contained in hole 7 is fitted with seats 13, of known type with rings or the like, located along the axis; further sealing rings 14 and 15 are interposed between ducts 2',3' and the continuous spherical surface of such ball 8 in order to achieve sealing against the fluid.

Figure 2A:
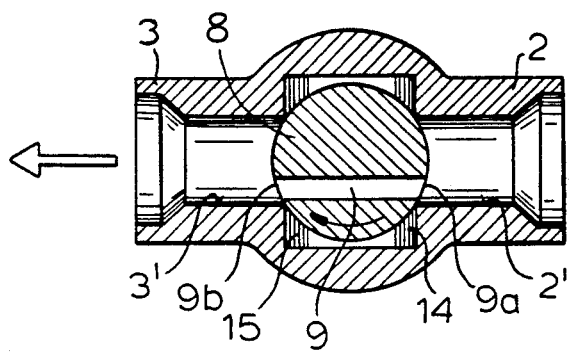
FIGS. 2a, 2b and 2c are cross sections along line II—II of FIG. 1 showing successive positions of the ball for the interception of the fluid.
Figure 2B:
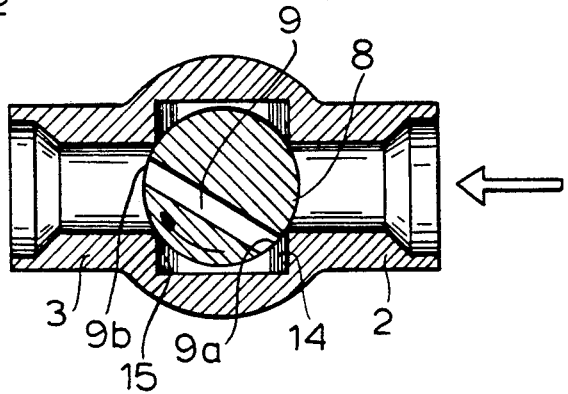
Figure 2C:
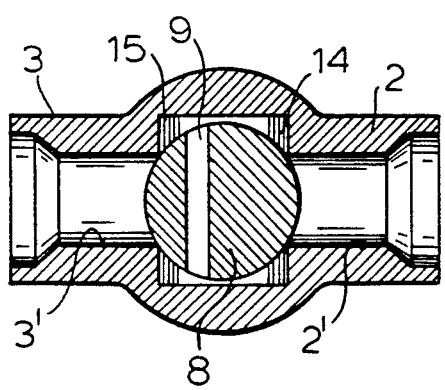

The through-duct 9 which passes through ball 8 has its longitudinal axis offset toward the lower hemisphere (FIG. 2a) relative to the longitudinal axis of ducts 2' and 3' passing through the center of the ball. As will be clear from the sequence in FIG. 2a,2b,2c, when ball 8 (FIG. 2a) is rotated to the position of free passage of the fluid, duct 9 is located below and parallel to the axis of ducts 2',3' and permits a flow of the desired capacity. However when it is desired to intercept the flow of fluid and there is initiated the rotation of ball 8 around its own axis perpendicular to the longitudinal axis of ducts 2' and 3' (FIG 2b). Duct 9 is initially located in an oblique position in which its inlet end 9a has already passed beyond upstream sealing ring 14, while outlet end 9b has not yet arrived at the downstream sealing ring 15.

Accordingly, while the supply has already been stopped, the outflow of the residual fluid contained in duct 9 has time to discharge via outlet end 9b, which is still open, so that the increase of specific velocity and any turbulence generated can be dissipated before the further rotation of ball 8 (FIG. 2c) moves the outlet aperture 9b of duct 9 to downstream ring 15, passing beyond it to achieve full closure of the valve, and duct 9 into a transverse position relative to the direction of flow and into the downstream part of the ball in its position of closure.

Any residual fluid which should come into contact with such rings 15 during the last stage of rotation, having now been substantially stopped, is no longer a cause of erosion or the like.

It is entirely self-evident, and therefore not illustrated, that during the operation of reopening of the valve the rotation in the opposite direction of ball 8 will move outlet end 9b of the duct past downstream ring 15 before inlet end 9a has passed beyond upstream ring 14 and therefore before duct 9 is supplied with fluid under pressure, thereby preventing the action of the pressurized fluid against the downstream sealing rings also during the reopening phase. By means of a valve according to this invention it is also possible to achieve the deflection of the fluid without this giving rise to action on downstream rings 15.

Figure 3:
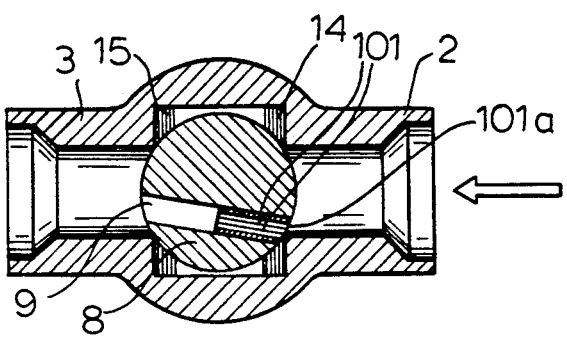
FIG. 3 is a sectional view of a valve with fluid deflection according to this invention.

Thus, as shown in FIG. 3, it is possible to insert in duct 9 a longitudinal baffle 100 provided with longitudinal channels 101 with axes parallel to the axis of duct 9, the inlet ends 101a of which may be intercepted independently of one another by means of partial rotation of ball 8 which moves the ends to be closed by sealing rings 14. In this manner the flow of fluid is deflected without part of the outlet end having to be closed in turn by downstream rings 15 against which the pressurized fluid would act and cause undesirable erosion.

Many variants may be introduced in the valve according to the invention without thereby departing from the scope of protection thereof; in particular, the form, the section and the exact positioning of duct 9 may be implemented in different ways in keeping with the capacity features required for a particular application.

I claim:

1. A ball valve, comprising:

a valve body having a cylindrical chamber having a valve-body axis;

means forming an inlet port and an outlet port aligned with said chamber and coaxial therewith;

a valve ball rotatable in said chamber about a rotation axis perpendicular to said valve-body axis;

an upstream sealing ring engaging said valve ball and disposed at an upstream side of said chamber between said valve ball and said inlet port;

a downstream sealing ring engaging said valve ball and disposed at a downstream side of said chamber between said valve ball and said outlet port;

a through-duct formed in said valve ball as the sole passage through said valve ball between said inlet and outlet sides, said through duct being offset from said valve body axis and parallel thereto in an open position of said valve ball effecting communication between said inlet and outlet ports through said valve ball, said through-duct having an inlet end passing fully past said upstream sealing ring prior to an outlet end of said through-duct reaching said downstream sealing ring upon rotation of said valve ball from said open position into a closed position of said valve ball, said through-duct lying transverse to said valve-body axis and said outlet end passing fully past said downstream sealing ring in said closed position; and means operable externally of said valve body and engaged with said valve ball for rotating said valve ball from one of said positions into the other of said positions.

2. The ball valve defined in claim 1 wherein said through-duct is formed with means subdividing said through-duct into longitudinal channels independently of one another and successively closed by passage of said channels past said upstream sealing ring.

* * * * *